(12) United States Patent
Niedzielski et al.

(10) Patent No.: US 8,171,111 B1
(45) Date of Patent: May 1, 2012

(54) SYSTEMS AND METHODS FOR NON-SPECIFIC ADDRESS ROUTING

(75) Inventors: David Michael Niedzielski, San Antonio, TX (US); Christopher S. Trost, San Antonio, TX (US); Roger Pena, Atascosa, TX (US); Tommy Lavelle, San Antonio, TX (US); Donald E. Clemons, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 196 days.

(21) Appl. No.: 12/188,187

(22) Filed: Aug. 7, 2008

(51) Int. Cl.
*G06F 15/16* (2006.01)
(52) U.S. Cl. .......................................... 709/219; 714/4.1
(58) Field of Classification Search .................. 709/219; 714/4.1
See application file for complete search history.

(56) References Cited

U.S. PATENT DOCUMENTS

| | | | |
|---|---|---|---|
| 6,842,774 B1 * | 1/2005 | Piccioni | 709/207 |
| 7,103,617 B2 * | 9/2006 | Phatak | 1/1 |
| 2002/0042818 A1 * | 4/2002 | Helmer et al. | 709/217 |
| 2002/0112087 A1 * | 8/2002 | Berg | 709/313 |
| 2002/0165944 A1 * | 11/2002 | Wisner et al. | 709/220 |
| 2004/0230756 A1 * | 11/2004 | Achiwa et al. | 711/162 |
| 2005/0010653 A1 | 1/2005 | McCanne | |
| 2005/0144292 A1 * | 6/2005 | Banga et al. | 709/227 |
| 2006/0064478 A1 * | 3/2006 | Sirkin | 709/223 |
| 2006/0075279 A1 * | 4/2006 | Cameros et al. | 714/4 |
| 2006/0193247 A1 | 8/2006 | Naseh et al. | |
| 2006/0193252 A1 | 8/2006 | Naseh et al. | |
| 2006/0195607 A1 | 8/2006 | Naseh et al. | |
| 2010/0076930 A1 | 3/2010 | Vosshall et al. | |

* cited by examiner

*Primary Examiner* — Thomas Dailey
(74) *Attorney, Agent, or Firm* — Brooks, Cameron & Huebsch, PLLC

(57) ABSTRACT

The present disclosure provides a system and method for online continuity. Online continuity can include a number of Internet or intranet access points via which one or more network addresses can be advertised. A client can be provided with availability of an application (e.g., a brand image application) via at least one of the Internet or intranet access points.

18 Claims, 4 Drawing Sheets ered routes. Systems may route a request from a user to a primary data center, if the primary data center is available to respond to the request, using a non-specific address. Examples of non-specific addresses include IP address prefixes.

SYSTEMS AND METHODS FOR NON-SPECIFIC ADDRESS ROUTING

CROSS REFERENCE TO RELATED APPLICATIONS

This application is related in subject matter to, and incorporates herein by reference in its entirety, each of the following: U.S. patent application entitled "SYSTEMS AND METHODS FOR NON-SPECIFIC ADDRESS ROUTING," bearing Ser. No. 12/188,188, filed on the same date as this application; and U.S. patent application entitled "SYSTEMS AND METHODS FOR NON-SPECIFIC ADDRESS ROUTING," bearing Ser. No. 12/188,190, also filed on the same date as this application.

This application is related in subject matter to, and incorporates herein by reference in its entirety, each of the following U.S. patent applications (each entitled "HIGH-AVAILABILITY DATA CENTER" and filed Sep. 19, 2006): Ser. No. 11/533,248 (Applicant Reference No. US-0128.01); Ser. No. 11/533,262 (Applicant Reference No. US-0128.02); and Ser. No. 11/533,272 (Applicant Reference No. US-0128.03).

This application is further related in subject matter to, and incorporates herein by reference in its entirety, each of the following U.S. patent applications (each entitled "SYSTEMS AND METHODS FOR DATA CENTER LOAD BALANCING" and filed on the same date as this application: application bearing Ser. No. 12/191,979; application bearing Ser. No. 12/191,985; and Ser. No. 12/191,993.

This application is further related in subject matter to, and incorporates herein by reference in its entirety, each of the following U.S. patent applications: Ser. No. 11/065,871 "DISASTER RECOVERY FOR ACTIVE-STANDBY DATA CENTER USING ROUTE HEALTH AND BGP" (published application US20060193247); Ser. No. 11/066,955 "APPLICATION BASED ACTIVE-ACTIVE DATA CENTER NETWORK USING ROUTE HEALTH INJECTION AND IGP" (published application US20060195607), and Ser. No. 11/067,037 "ACTIVE-ACTIVE DATA CENTER USING RHI, BGP, AND IGP ANYCAST FOR DISASTER RECOVERY AND LOAD DISTRIBUTION" (published application US20060193252)—each by Naseh and Gundi.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Embodiments disclosed and taught herein relate generally to data centers (e.g., redundant or backup data centers); and, more specifically, they relate to routing to data centers (e.g., redundant or backup data centers) using non-specific addresses.

Companies often provide access to their websites through multiple Internet access points. Failure of one access point often results in customers no longer being able to access a web site through that access point. This may cause a major disruption and dissatisfaction for customers. Furthermore, such failures may not be quickly resolved because they are often not detected until someone reports a problem.

Embodiments disclosed herein are generally related to an improved system for automatically rerouting to a standby data center. The improved system in particular may promote an experience of online continuity.

An improved system may be applied, for example, to improving a brand image. A brand image is considered to be a powerful asset for many organizations. Organizations may allocate significant capital toward protecting their brand image in the form of advertising, market surveys and analyses, quality control measures, trademark protection, and other means. As an organization grows, it may tend to develop an online brand image, sometimes associated with a website or other online application. An online brand image for an organization may be as significant of an asset as a more traditional brand image, such as reputation for quality products.

Aspects of an online brand image for an organization include availability or continuity of presence of online applications projecting the brand image. For example, an organization may wish to project such characteristics as strength, reliability, integrity, security, and others through persistent presence of an online application. An organization may desire to provide "always-on" online applications such that a client using the applications receives, or at least perceives, continuous service. Accordingly, much effort has been exerted in the areas of reliability, durability, and security of online applications, particularly with respect to data centers that host such online applications.

As continuity of online applications hosted in a data center may be critical to particular organizations, various efforts have been made to enhance the reliability of data centers. For example, some data centers are provided with physical reliability such as housing the data center in an inconspicuous location, providing restricted access to the data center, providing the data center with environmental isolation and control, and providing electrical power supply redundancy to the data center. Another element of reliability that has been added to data center design is to provide an organization with more than one physical data center, e.g., providing multiple data centers at different locations. Likewise, an online access point, such as an Internet or intranet connection, to a data center may fail, which could obviate certain measures taken to protect the functionality of a single data center.

Having "redundant" or "backup" data centers may provide an organization with the ability to protect online application functionality against harmful factors that extend beyond the scope of the organization's control over a single data center. For example, a single data center may be vulnerable to physical failure, e.g., from terrorist activity, fire, earthquake, etc. A single data center may be vulnerable to electronic failure, e.g., "hacker" activity such as viruses, broadcast storms, denial of service attacks, and the like. A single data center may be vulnerable to electric and/or telecommunications failure of such a magnitude that the provided redundant systems internal to the data center are unable to mitigate the failure. Other failures that reduce or eliminate the functionality of a single data center are possible. In such instances, having additional data centers at separate geographic locations may provide the organization with the ability to maintain data center functionality after the loss of a single data center or online access point.

SUMMARY

A system is disclosed for providing data centers (e.g., redundant or backup data centers) using non-specific addressing comprising a first access point configured to advertise a specific address to at least one router on the Internet and a second access point configured to advertise a non-specific address. The specific address may be included within the non-specific address. The access points may provide access to the Internet for a first and a second mirrored data center, respectively, for example. The first data center could be primary and the second data center could be secondary. Traffic could be directed to the first data center when the first data center is available and automatically directed to the second data center when the first data center is unavailable. The specific address may cause the router to store a preferred route through the first subsystem. The non-specific address may cause the router to store a non-preferred route through the second subsystem. An improved system may be applied in particular to improving a brand image through online continuity.

In one or more embodiments, an improved system for online continuity may include a first Internet access point via which a first specific network address is advertised for an application. The system may also include a second Internet access point via which a second specific network address is advertised for the application. The system may further include a third Internet access point via which a less-specific network address is advertised for the application. The application could be available to a client via at least one of the first and second Internet access points when at least one of the first and second Internet access points meets particular criteria. The application could be available to the client via the third Internet access point when at least one of the first and second Internet access points fails to meet particular criteria.

According to one or more embodiments, a method for online continuity may include advertising a first specific network address for an application via a first Internet access point. The method may also include advertising a second specific network address for the application via a second Internet access point. The method may further include advertising a less-specific network address for the application via a third Internet access point. The method may include making the application available to a client via at least one of the first and second Internet access points when at least one of the first and second Internet access points meets particular criteria. The method may include making the application available to the client via the third Internet access point when at least one of the first and second Internet access points fails to meet particular criteria.

One or more embodiments may include a computing device readable medium having instructions stored thereon, which, when executed by a processor, cause a device to perform a method for online continuity, including advertising a first specific network address for an application via a first Internet access point. The method may include advertising a second specific network address for the application via a second Internet access point. The method also may include advertising a less-specific network address for the application via a third Internet access point. The method may further include making the application available to a client via at least one of the first and second Internet access points when at least one of the first and second Internet access points meet particular criteria. The method may include making the application available to the client via the third Internet access point when at least one of the first and second Internet access points fails to meet particular criteria.

In one or more embodiments, a system for online continuity may include a first Internet access point via which a specific network address is advertised for an application. The system may include a second Internet access point via which a less-specific network address is advertised for the application. The application may be available to a client via the first Internet access point when the specific network address is advertised via the first Internet access point. The system may protect online continuity by providing availability of the application to the client via the second Internet access point when the specific network address ceases to be advertised via the first Internet access point.

According to one or more embodiments, a method for online continuity may include advertising a specific network address via a first Internet access point for an application. The method may also include advertising a less-specific network address via a second Internet access point for the application. The method may further include providing availability of the application to a client via the first Internet access point when the specific network address is advertised via the first Internet access point. The method may also include protecting online continuity by providing availability of the application to the client via the second Internet access point when the specific network address ceases to be advertised via the first Internet access point.

One or more embodiments may include a computing device readable medium having instructions stored thereon, which, when executed by a processor, cause a device to perform a method for online continuity, including advertising a specific network address via a first Internet access point for an application. The method may also include advertising a less-specific network address via a second Internet access point for the application. The method may further include providing availability of the application to a client via the first Internet access point when the specific network address is advertised via the first Internet access point. The method may include protecting online continuity by providing availability of the application to the client via the second Internet access point when the specific network address ceases to be advertised via the first Internet access point.

In one or more embodiments, a system for online continuity may include a first intranet access point via which a specific network address for an application is advertised. The system may include a second intranet access point via which the specific network address for the application is advertised. The system also may include a third intranet access point via which a less-specific network address for the application is advertised. The system may further include a client having availability of the application via at least one of the first, second, and third intranet access points. The first, second, and third intranet access points, and the client may be interconnected via an autonomous intranetwork using interior gateway protocol (IGP).

According to one or more embodiments, a method for online continuity may include advertising a specific network address for an application via a first intranet access point. The method may include advertising the specific network address for an application via a second intranet access point. The method also may include advertising a less-specific network address for the application via a third intranet access point. The method further may include providing availability of the application to a client via at least one of the first, second, and third intranet access points. The method may include interconnecting the first, second, and third intranet access points, and the client via an autonomous intranetwork using interior gateway protocol (IGP).

One or more embodiments may include a computing device readable medium having instructions stored thereon, which, when executed by a processor, cause a device to perform a method for online continuity, including advertising a specific network address for an application via a first intranet access point. The method may include advertising the specific network address for the application via a second intranet access point. The method also may include advertising a less-specific network address for the application via a third intranet access point. The method may further include providing availability of the application to a client via at least one of the first, second, and third intranet access points. The method may include interconnecting the first, second, and third intranet access points, and the client via an autonomous intranetwork using interior gateway protocol (IGP).

DETAILED DESCRIPTION

Figure 1:
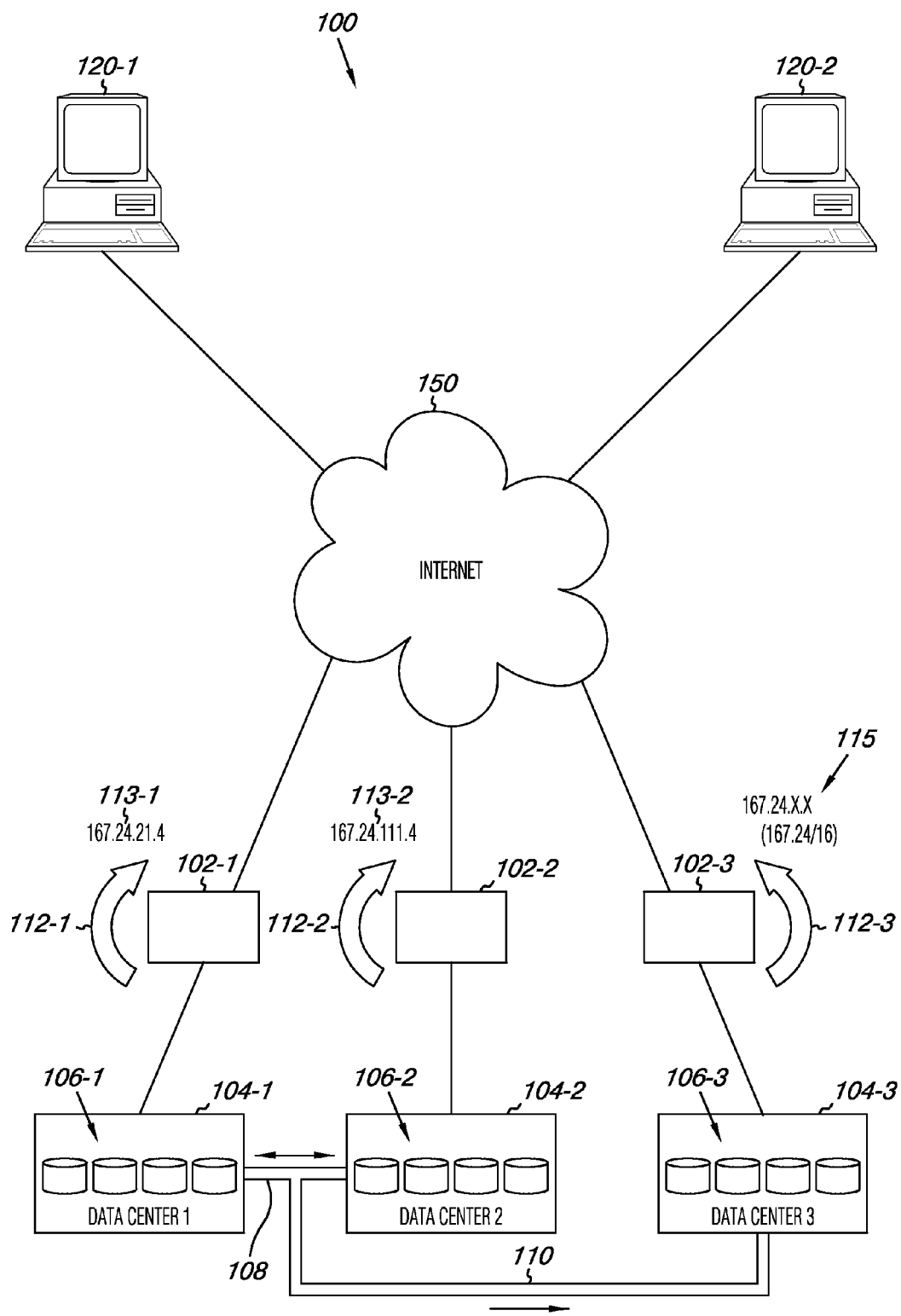
FIG. 1 illustrates a block diagram of a system for online continuity having three Internet access points according to one or more embodiments.

The Figures described above and the written description of specific structures and functions provided herein are not presented to limit the scope of what Applicants have invented or the scope of the appended claims. Rather, the Figures and written description are provided to teach any person skilled in the art to make and use that for which patent protection is sought. Those skilled in the art will appreciate that not all features of a commercial embodiment are described or shown for the sake of clarity and understanding. Persons of skill in this art will also appreciate that the development of an actual commercial embodiment incorporating various aspects of this disclosure may require numerous implementation-specific decisions to achieve the developer's ultimate goal for the commercial embodiment. Such implementation-specific decisions may include, and likely are not limited to, compliance with system-related, business-related, government-related standards and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the embodiments disclosed and taught herein are susceptible to numerous and various modifications and alternative forms. Also, the use of a singular term, such as, but not limited to, "a," is not intended as limiting of the number of items. Furthermore, the use of relational terms, such as, but not limited to, "top," "bottom," "left," "right," "upper," "lower," "down," "up," "side," and the like are used in the written description for clarity in specific reference to the Figures and are not intended to limit the scope of embodiments or the appended claims.

Particular embodiments may be described below with reference to block diagrams and/or operational illustrations of methods. It will be understood that each block of the block diagrams and/or operational illustrations, and combinations of blocks in the block diagrams and/or operational illustrations, may be implemented by analog and/or digital hardware, and/or computer program instructions. Such computer program instructions may be provided to a processor of a general-purpose computer, special purpose computer, ASIC (application specific integrated circuit), and/or other programmable data processing system. The executed instructions may create structures and functions for implementing the actions specified in the block diagrams and/or operational illustrations. In some alternate implementations, the functions/actions/structures noted in the Figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

Computer programs for use with or by embodiments disclosed herein may be written in an object oriented programming language, conventional procedural programming language, or lower-level code, such as assembly language and/or microcode. The program may be executed entirely on a single processor and/or across multiple processors, as a stand-alone software package or as part of another software package.

In general, Applicants have created a system for providing data centers (e.g., redundant or backup data centers) using non-specific addressing comprising a first access point configured to advertise a specific address to at least one router on the Internet and a second access point configured to advertise a non-specific address. The non-specific address may cause the router to store a non-preferred route through the second subsystem. Traffic may be directed to the first data center when the first data center is available and automatically directed to the second data center when the first data center is unavailable. Online continuity in particular may be promoted.

The Figures herein follow a numbering convention in which the first digit or digits correspond to the drawing figure number and the remaining digits identify an element in the drawing. Similar elements between different figures may be identified by the use of similar digits. For example, 102 may reference element "102" in FIG. 1, and a similar element may be referenced as 202 in FIG. 2.

As used herein, an access point may be a layer 1, e.g., physical layer, connection such as an Ethernet cable, a modem, a fiber optic cable, a USB cable, a synchronous optical network (SONET) connection, 802.11x wireless connections, T-carrier links, or other connections. As used herein, failure to meet particular criteria for an access point includes loss of a physical layer connection, e.g., a modem that is not working. Failure to meet particular criteria also includes loss of service via a physical layer access point. For example, if a computing device is connected to an Internet service provider (ISP) through an Ethernet cable connected to a modem, and the ISP ceases to provide service, then such an occurrence is referred to herein as failure to meet particular criteria, where the access point may refer to any of the Ethernet cable, modem, or other physical connection, regardless of whether the physical connections are otherwise functional. Likewise, an access point is considered to meet particular criteria if it is providing a network connection, e.g., to the Internet or intranet. The above examples of particular criteria are not provided as a limitation on particular criteria. For example, particular criteria may include inability to handle a given volume of traffic for an access point. Other criteria are possible.

That a network address may be advertised via an access point means that the advertisement touches or passes through the access point. That a network address may be advertised via an access point does not require that the advertisement originate or terminate at the access point.

As used herein, an autonomous intranet is a network or collection of networks under the control of an organization, e.g., the organization may have a common routing policy for the autonomous intranet. An autonomous network may or may not have a connection to the public Internet. As used herein, a website is a collection of one or more web pages that may be associated with a particular person or organization. For example, a website associated with the uniform resource locator (URL) http://www.uspto.gov is a website including a number of web pages, e.g. http://www.uspto.gov/main/patents.htm, which may generally be regarded as the US Patent and Trademark Office (USPTO) website, and may be managed by the USPTO or their designated agents.

As used herein, applications (e.g., online or downloadable) include services such as websites, streaming media, executable program applications, file transfer protocol (FTP) applications, data storage, online business transactions such as banking, insurance, and the like, among other online applications. In one or more embodiments, application data includes data associated with online applications such as files stored in databases, client profiles, client passwords, financial records, executable instructions for providing the online application, and other such data. Applications may present brand images, and, in downloadable embodiments, may include banking applications, e-commerce applications, accounting applications, inventory tracking applications, and the like.

Figure 2:
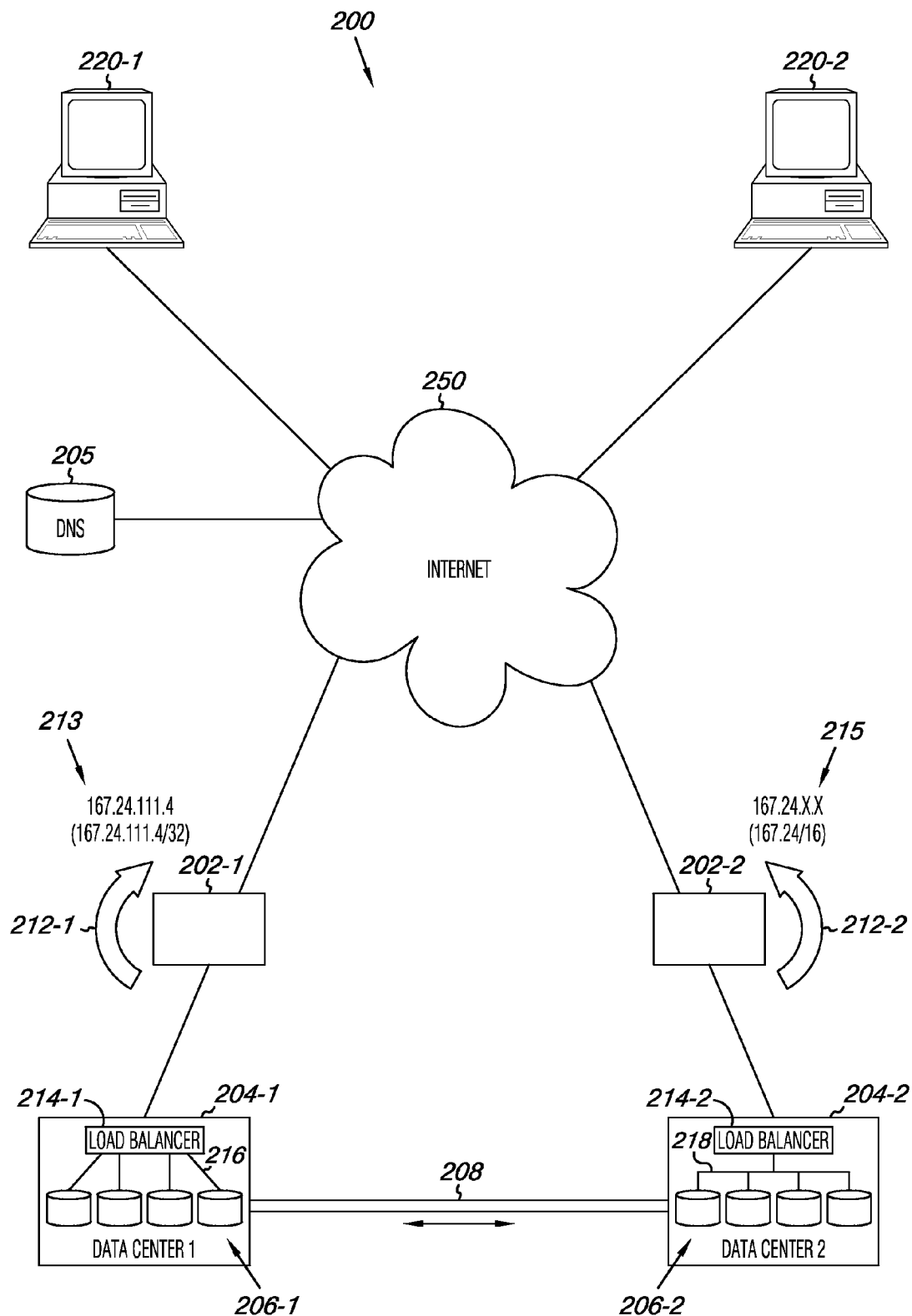
FIG. 2 illustrates a block diagram of a system for online continuity having two Internet access points according to one or more embodiments.
Figure 3:
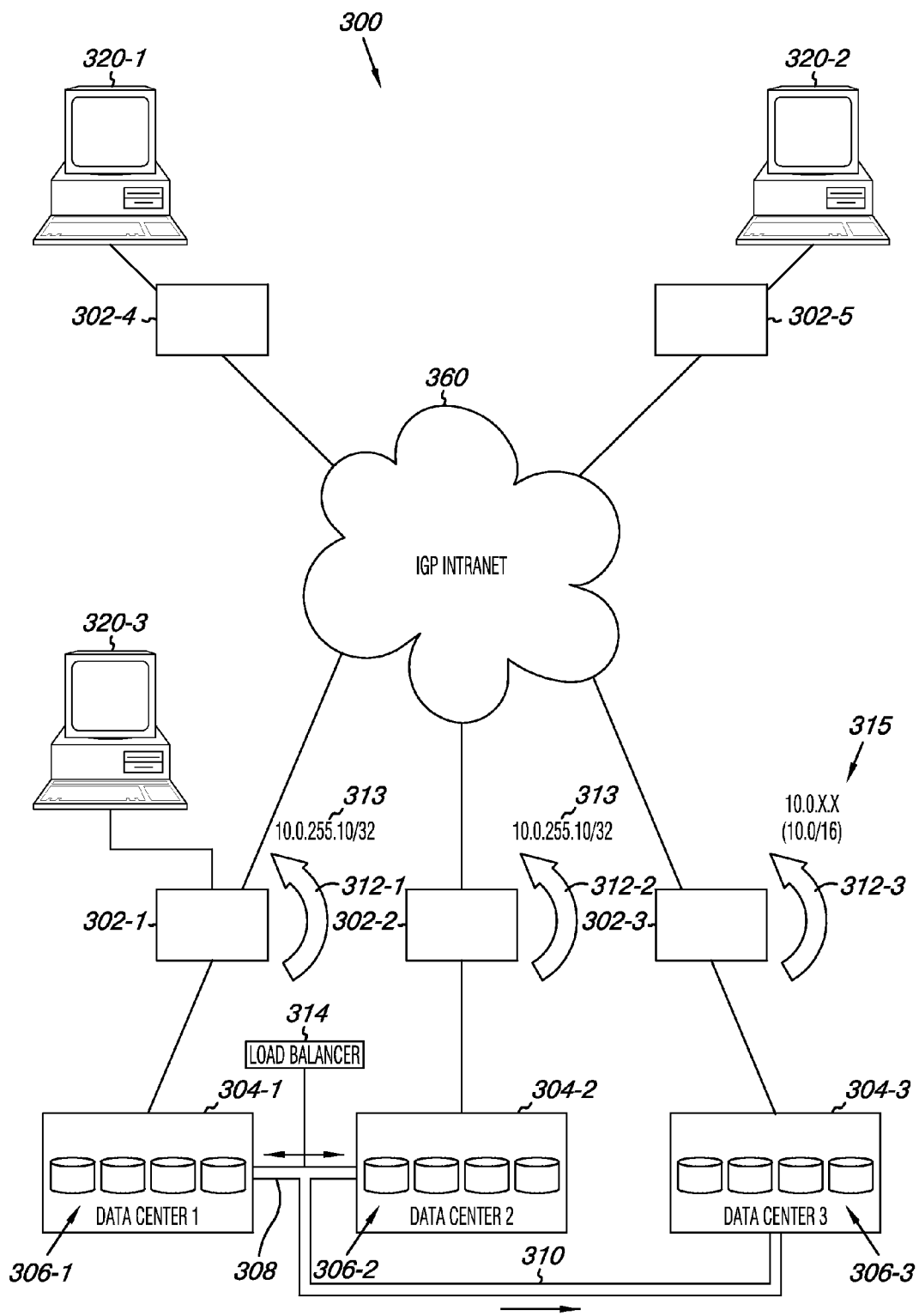
FIG. 3 illustrates a block diagram of a system for online continuity having three intranet access points according to one or more embodiments.

In one or more embodiments, various components of the embodiments of systems for online continuity described herein, e.g., systems 100, 200, and 300 in FIGS. 1, 2, and 3, may involve the use of logic, e.g., application specific integrated circuits (ASICs), a processor, a controller, or the like. The processor may be interfaced with a memory configured to provide storage of a set of computer readable instructions in the form of software, firmware, and/or hardware that provides functionality. The interfaced memory may be implemented as a combination of volatile and non-volatile memory, such as dynamic random access memory ("DRAM"), EEPROM, flash memory, or the like.

Referring to FIG. 1, a block diagram is illustrated of a system 100 for online continuity having three Internet access points 102-1, 102-2, and 102-3 according to one or more embodiments. Each access point may be associated with a data center (e.g., a redundant or backup data center). For example, a first access point 102-1 may be associated with a first data center 104-1, a second access point 102-2 may be associated with a second data center 104-2, and a third access point 102-3 may be associated with a third data center 104-3. An organization operating multiple data centers may use one or more data centers, e.g., data centers 104-2 and 104-3, as failover data centers in case another data center, e.g., data center 104-1, loses some or all of its functionality, such as a loss of functionality of a network access point. Each data center may include a number of servers, e.g., servers 106-1 in data center 1, servers 106-2 in data center 2, and servers 106-3 in data center 3. The data centers may include various servers, such as web servers, application servers, file servers, email servers, print servers, database servers, etc. The data centers may also be associated with a load balancer and one or more routers, switches, hubs, and other networking devices.

In an embodiment illustrated in FIG. 1, a first specific network address 113-1 may be advertised 112-1 via a first access point 102-1; a second specific network address 113-2 may be advertised 112-2 via a second access point 102-2; and a less-specific address 115 may be advertised 112-3 via a third access point 102-3. Advertising a network address may include identifying a route for traffic having a particular destination address to upstream network components such as routers. That is, advertising a network address may instruct upstream routers to direct traffic for that address to, or through, the source of the advertisement. The specific network addresses, e.g., 167.24.21.4 and 167.24.111.4, may be advertised as single-host internet protocol (IP) addresses. The less-specific address, e.g., 167.24.X.X, may be advertised as a multi-host IP address. As illustrated in FIG. 1, the access points connect to the Internet 150. Accordingly, a border gateway routing protocol (BGP) may be used for routing network traffic through the access points. Using BGP, a specific address may be a preferred route to, e.g., appear shorter than, a less-specific address. For example, a router on the Internet directing traffic from client 120-1 to IP address 167.24.111.4 may select the route advertised 112-2 via access point 102-2, rather than the route advertised 112-3 via access point 102-3.

As further illustrated in FIG. 1, the less-specific network address 115 may have a network prefix equal to at least a portion of the specific network addresses 113-1 and 113-2. For example, the first two octets of the single-host IP addresses (167.24) may be equal to the first two octets of a multi-host IP address (e.g., 167.24/16). Accordingly, if either or both of the access points 102-1 and 102-2 fail to meet particular criteria, traffic directed to network addresses associated with the access points, e.g., specific network addresses 113-1 and 113-2, may be routed through the third access point 102-3 via which the less-specific network address 115 is advertised 112-3. That is, failure of an access point to meet particular criteria, e.g., access point 102-2, may result in, or result from a specific network address ceasing to be advertised via the access point. BGP routers in the Internet 150 may then route traffic addressed to the specific network address 113-2 through the access point 102-3 via which the less specific network address 115 is advertised.

A number of forms of data replication between data centers are described herein. According to one or more embodiments of the present disclosure, data replication may be accomplished in a manner effectively to implement the goals of atomicity, consistency, isolation, and durability (ACID). A goal of atomicity is to guarantee that each component of an operation is completed before the operation is validated. For example, if a particular data value is updated in a server in data center 1, atomic replication should guarantee that the particular data value is updated in a corresponding server in data center 2 before the update is validated, e.g., given an indication that the operation was completed successfully. A goal of consistency is to ensure that data and data organization follow a number of established parameters for a particular database. For example, if an operation changed a data value resulting in an invalid result, consistency would require that the data be returned to its original value rather than storing the invalid result. A goal of isolation is to prevent multiple operations from affecting a particular data value simultaneously. For example, an operation being executed on a data value in data center 1 should not be allowed to process simultaneously with an operation on the same data value in data center 2. A goal of durability is to ensure that a validated, e.g., successful, operation is properly recorded such that any data values affected by the operation are stored in their affected state, rather than a previous unaffected state. For example, if an operation to change a data value from "X" to "Y" successfully completes in data center 1, and data center 1 later experiences a loss of connectivity, for example, then the data value should be accessible as "Y" in data center 2, or in data center 1 after a recovery operation. Although the above examples refer to two data centers, the ACID principles may apply to systems including other numbers of data centers.

In an embodiment illustrated in FIG. 1, data center 1 and data center 2 are interconnected via an autonomous intranetwork connection 108. The autonomous intranetwork connection 108 may be a fiber optic connection, T-carrier connection, or another high-speed data connection. The autonomous intranet connection 108 may be a secure connection. In one or more embodiments, application data, e.g., brand image application data, may be synchronously replicated between data center 1 and data center 2 via the autonomous intranetwork connection 108. In some instances, application data may be atomically replicated between data center 1 and data center 2 such that a modified, or new, data value may be stored both in data center 1 and data center 2 before an indication of a successfully completed transaction is provided for an operation modifying or creating a particular data value. For example, network traffic from a client, e.g., client 120-1, could be routed to data center 1 and processed on one or more servers 106-1 therein. The client traffic could effect an operation that could add or modify an application data value stored in one or more servers 106-1. The new or modified application data value could be replicated and stored in one or more servers 106-2 in data center 2 before network traffic returned to the client 120-1 indicated that the requested operation completed successfully.

According to an embodiment illustrated in FIG. 1, the autonomous intranetwork connection 108 may be used to aid in splitting processing of application data between data center 1 and data center 2. One or more application processing servers among the number of servers 106-1 in data center 1 and the number of servers 106-2 in data center 2 may split processing loads for embodiments where both data center 1 and data center 2 are maintained as active data centers. An active data center is one that receives and processes client traffic. For example, traffic from a client, e.g., client 120-1, routed to data center 1 could require multiple processing operations. The multiple processing operations could be performed entirely within data center 1, transferred entirely to data center 2 via autonomous intranetwork connection 108, or performed partially within data center 1 and partially within data center 2.

Another example of split processing applies to traffic from multiple clients, e.g., clients 120-1 and 120-2. Traffic from clients 120-1 and 120-2 may require multiple processing applications, and as such, traffic from each client may be split between data center 1 and data center 2 using the autonomous intranetwork connection 108 such that a first type of processing application is performed in data center 1 and a second type of processing application is performed in data center 2. For example, traffic using website application processing may be processed in data center 1, while traffic using file server processing may be processed in data center 2. For embodiments where data center 1 and data center 2 are maintained as active/standby data centers, processing may be split such that one data center is primary, e.g., the active data center, and the other data center is secondary, e.g., the standby data center.

Application data may be asynchronously replicated from data center 1 and data center 2 to a third data center 104-3 via a second autonomous intranetwork connection 110. The second autonomous intranetwork connection 110 may be a same type of connection as the autonomous intranetwork connection 108 between data center 1 and data center 2, or a different type. For example autonomous intranetwork connection 110 may be a fiber optic connection, T-carrier connection, or another high-speed data connection. An asynchronous replication of data is complete upon successful receipt of the data. That is, unlike synchronous replication wherein both sender and receiver must confirm the replication, asynchronous replication allows the sender to "fire and forget" the data to be replicated. Everything else being equal, asynchronous replication may be faster than synchronous replication. Although embodiments of the present disclosure are not limited to having particular limits on distances between data centers, data center 1 and data center 2 may be more proximate to each other than they are to data center 3, at least in part due to the generally faster speed of asynchronous replication of data over the second autonomous intranetwork connection 110.

Asynchronous replication of data via the second autonomous intranetwork connection 110 may allow for durable replication of data to data center 3. For example, after one or more servers 106-3 in data center 3 successfully receive an updated or new data value, the new data value will not revert to a prior state. In one or more embodiments data may be asynchronously replicated to data center 3 via the second autonomous intranet connection 110 after it has been synchronously replicated between data center 1 and data center 2 via autonomous intranet connection 108. In one or more embodiments data may be asynchronously replicated to data center 3 via the second autonomous intranetwork connection 110 from each of data center 1 and data center 2 without regard to whether synchronous replication has completed.

Replication of data, both synchronous and asynchronous, e.g., via autonomous intranetwork connections 108 and 110, may be managed at a database management system (DBMS) level, rather than, for example, at an operating system (OS) level. Providing online applications may involve the use of a significant amount of static data. Static data may include data that is not modifiable by a client and/or data that does not change frequently. As such, servers in each data center may maintain separate copies of static data that are generally not replicated between data centers in order to provide efficient use of bandwidth for replication of dynamic data. Dynamic data may include data that is supplied and/or modifiable by a client. Dynamic data may include data that is created for a particular client in association with a particular client session. Accordingly, a number of different database management systems may be used with different data types. Examples of relational DMBS include Microsoft's SQL Server, Oracle Database, and IBM's DB2. Embodiments are not limited to the use of any or all of these particular systems.

Servers, e.g., servers 106-1, may host a number of applications. An organization may host one or more applications in multiple data centers, e.g., data centers 104-1 and 104-2. In one or more embodiments, a number of applications may be made fully available to a client, e.g., client 120-1, via at least one of access points 102-1 and 102-2 when at least one of the access points is functional. Analogous to the description above, application data may be synchronously replicated between data center 1 and data center 2. Accordingly, full availability of an application may be maintained from either data center via an associated Internet access point. For example, the data centers illustrated in FIG. 1 may host an application that is a website for an organization "www.organization.com." When a client, such as client 120-1, directs a web browser to that URL, a domain name system (DNS) server, e.g., DNS server 205 in FIG. 2, may resolve either of the specific addresses 113-1 or 113-2, when either is functional. As such, the website may be made fully available to the client via at least one of the Internet access points 102-1 and 102-2.

Analogous to the description above, application data may be asynchronously replicated from data centers 1 and 2 to data center 3 via the second autonomous intranetwork connection 110. Accordingly, at least partial availability of one or more applications is available to a client via Internet access point 112-3 when at least one of Internet access point 102-1 and Internet access point 102-2 fail to meet particular criteria. In one or more embodiments, full availability of the application may be available via access point 102-3. In one or more embodiments, partial availability of the application is available via access point 102-3, for example, when insufficient dynamic application data has been replicated to data center 3 to maintain full availability at a given point in time. In such embodiments, full availability may be restored after application data replication has been completed, among other restoration methods such as failback.

By way of example, and not by way of limitation, an application (e.g., a brand image application) may be a website. The website may be made at least partially available to a client, analogous to the description above, including at least a main webpage and a login page, and, for some clients, a webpage for providing certain static data. A website may have a membership basis, such that member clients, e.g., authorized clients, may have access to a number of portions of the website, e.g., web pages, to which non-member clients do not have access. When such a website is made at least partially available to clients according to one or more embodiments, an inability of a non-member client to gain access to the website beyond a login page may conceal a failure of at least one of the first access point 102-1 and the second access point 102-2 to meet particular criteria to the non-member client. In addition, providing certain static data to a member client, e.g., via access point 102-3, when at least one of access points 102-1 and 102-2 have failed to meet particular criteria may conceal the one or more failures to meet particular criteria to the member client. For example, the member client could be provided with a main web page, a login page, and certain web pages containing static data generally not requiring replication. In the event a member client attempted to access certain dynamic data that had not been replicated to data center 3, the client may be provided with a web page based on static data indicating that the website is temporarily being serviced and will resume full functionality at a later time.

Referring to FIG. 2, a block diagram is illustrated of a system 200 for online continuity having two Internet access points 202-1 and 202-2 according to one or more embodiments of the present disclosure. Each access point may be associated with a data center. For example, a first access point 202-1 may be associated with a first data center 204-1, and a second access point 202-2 may be associated with a second data center 204-2. An organization operating multiple data centers, e.g. data centers 204-1 and 204-2, may use a data center, e.g., data center 204-2, as failover data center in case another data center, e.g., data center 204-1, loses some or all of its functionality, such as a loss of functionality of a network access point 202-1. Each data center may include a number of servers, e.g., servers 206-1 in data center 1 and servers 206-2 in data center 2. The data centers may include various servers, such as web servers, application servers, file servers, email servers, print servers, database servers, etc. The data centers may also be associated with a load balancer, e.g., load balancers 214-1 and 214-2, and one or more routers, switches, hubs, and other networking devices.

Load balancers 214-1 and 214-2 may balance network traffic, e.g., from a number of clients, both within a particular data center, e.g., data center 204-1, and between a number of data centers, e.g., data centers 204-1 and 204-2. Load balancers may perform health checks on a number of servers 206-1 in a data center 204-1. In one or more embodiments, a load balancer may perform a health check on a number of servers to determine whether the servers are functional, e.g., whether traffic should continue to be routed to the servers. A network administrator, for example, may establish certain criteria under which information received from a health check may cause a load balancer to initiate a failover. Such information may be used by a load balancer to initiate a failover between data centers, for example, by causing a network address to cease to be advertised, as is described in more detail below. A load balancer may be connected to a number of servers in a number of topologies. For example, load balancer 214-1 is illustrated connected to a number of servers 206-1 in a star topology 216, while load balancer 214-2 is illustrated connected to a number of servers 206-2 in a bus topology 218. Other topologies are possible as will be understood by one of ordinary skill in the art. Embodiments are not limited to the particular examples illustrated in FIG. 2.

In an embodiment illustrated in FIG. 2, a specific network address 213 may be advertised 212-1 via a first access point 202-1 and a less-specific address 215 may be advertised 212-2 via a second access point 202-2. The specific network address, e.g., 167.24.111.4/32, may be advertised as a single-host internet protocol (IP) address. The less-specific address, e.g., 167.24.X.X, may be advertised as a multi-host IP address (167.24/16). As illustrated in FIG. 2, the access points connect to the Internet 250. Accordingly a border gateway routing protocol (BGP) may be used for routing network traffic to and from the access points. Using BGP, a specific address may be a preferred route to, e.g., appear shorter than, a less-specific address. For example, a router on the Internet directing traffic from client 220-1 to IP address 167.24.111.4 may select the route advertised 212-1 via access point 202-1, rather than the route advertised 212-2 via access point 202-2.

As illustrated in FIG. 2, the less-specific network address 215 may have a network prefix equal to at least a portion of the specific network address 213. For example, the first two octets of the single-host IP addresses (167.24) may be equal to the first two octets of a multi-host IP address (167.24/16). Accordingly, if the access point 202-1 fails to meet particular criteria, traffic directed to network addresses associated with the access point, e.g., specific network addresses 213, may be routed through the second access point 202-2 via which the less-specific network address 215 is advertised 212-2. That is, failure of an access point to meet particular criteria, e.g., access point 202-1, may result in, or result from a specific network address ceasing to be advertised via the access point. BGP routers in the Internet 250 may then route traffic addressed to the specific network address 213 through the access point 202-2 via which the less specific network address 215 is advertised. Although the example IP addresses illustrated herein may appear in IPv4 form, embodiments are not so limited. Embodiments may be practiced using IPv6 and other network protocols.

In an embodiment illustrated in FIG. 2, data center 1 and data center 2 may be interconnected via an autonomous intranetwork connection 208. In one or more embodiments, application data, e.g., brand image application data, may be synchronously replicated between data center 1 and data center 2 via the autonomous intranetwork connection 208. In some instances, application data may be atomically replicated between data center 1 and data center 2 such that a modified, or new, data value may be stored both in data center 1 and data center 2 before an indication of a successfully completed transaction is provided for an operation modifying or creating a particular data value.

Servers, e.g., servers 206-1, may host a number of applications. An organization may host one or more applications in multiple data centers, e.g., data centers 204-1 and 204-2. In one or more embodiments, a number of applications may be made fully available to a client, e.g., client 220-1, via the first access point 202-1 when the specific network address is advertised 212-1 via that point, e.g., when access point 202-1 is functional. Analogous to the description above, application data may be synchronously replicated between data center 1 and data center 2. Accordingly, full availability of an application may be maintained from either data center via an associated Internet access point.

According to one or more embodiments, at least partial availability of one or more applications may be provided to a client via the second access point 202-2 when the specific network address 213 ceases to be advertised 212-1 via the first access point 202-1. In such instances, traffic from a client, e.g., client 220-1, that was addressed to the specific network address 213 may be logically routed through the first Internet access point 202-1, and physically routed through the second Internet access point 202-2. When a client addresses traffic to the specific network address 213 after the first access point 202-1 has failed to meet particular criteria, such traffic may still be routed through the second access point 202-2 according to the less-specific address 215, regardless of whether the client has refreshed a cache associated with domain name system (DNS) server 205 resolution. That is, traffic may continue to be addressed to the specific network address 213. Such traffic may have separate logical and physical routes that are transparent to the client.

Referring to FIG. 3, a block diagram is illustrated of a system 300 for online continuity having access points 302-1, 302-2, 302-3, 302-4, and 302-5 according to one or more embodiments. A number of access points may be associated with a data center. For example, a first access point 302-1 may be associated with a first data center 304-1, a second access point 302-2 may be associated with a second data center 304-2, and a third access point 302-3 may be associated with a third data center 304-3. A number of access points may be associated with a client connection to an interior gateway protocol (IGP) intranet. For example, access point 302-4 may be associated with client 320-1 and access point 302-5 may be associated with client 320-2.

Each of the interconnections illustrated in FIG. 3 may represent an IGP link, as an embodiment illustrated in FIG. 3 may represent an autonomous network including an IGP intranet 360. That is, one organization, e.g., one company, may exercise topographic control over the network. Although the system 300 may be connected, e.g., via border gateway protocol (BGP) to the Internet, such a connection is not illustrated herein so as not to obfuscate embodiments described with respect to FIG. 3. As such, clients, e.g., client 320-1, may connect to the IGP intranet 360 via an intranet connection. Clients, such as client 320-1, may use computing devices connected to the IGP network 360, e.g., a computing device operated by an employee of the organization that exercises topographic control over the network. Embodiments are not limited to employee-clients; other client-types are possible.

One or more load balancers 314 may balance network traffic, e.g., from a number of clients. Traffic may be balanced both within a particular data center, e.g., data center 304-1, and between a number of data centers, e.g., data centers 304-1 and 304-2.

In an embodiment illustrated in FIG. 3, a specific network address 313 may be advertised 312-1 via a first access point 302-1. The specific network address may also be advertised 312-2 via a second access point 302-2. A less-specific address 315 may be advertised 312-3 via a third access point 302-3. The specific network address, e.g., 10.0.255.10/32, may be advertised as single-host internet protocol (IP) addresses. The less-specific address, e.g., 10.0.X.X, may be advertised as a multi-host IP address (10.0/16). At least a network prefix, e.g., 10.0., may be advertised 312-3 as the less-specific network address 315 such that traffic addressed to any host having the network prefix may be accepted via the third intranet access point 302-3. As illustrated in FIG. 3, the network prefix, e.g., 10.0., may be advertised as a portion of the specific network address 313, e.g., 10.0.255.10, via the first intranet access point 302-1 and the second intranet access point 302-2. Accordingly, traffic from a client that was previously routed to data center 1 may be routed to either data center 2 or data center 3 without refreshing DNS cache. That is, data center 2 is associated with the same network address as data center 1, therefore the address would not require updating. Likewise, data center 3 is associated with a less-specific address including a same network prefix as the address associated with data center 1. Traffic addressed to data center 1 may be routed to data center 3 without updating and/or changing the destination address.

Routers in system 300 may use a particular routing protocol, e.g., open shortest path first (OSPF), to select a network path for traffic between a client, e.g., client 320-1, and a data center, e.g., data center 306-1. In some embodiments, the network path selected by one or more routers for traffic from a client to a data center may be the topographically shortest route, e.g., the route which may provide the highest speed for traffic flow to/from the client, the fewest number of hops, and/or the lowest cost metric, depending on the particular routing configuration employed. Accordingly, when the first and second access points 302-1 and 302-2 are functional, traffic from a particular client may be routed through one of the access points using OSPF protocol.

In an embodiment illustrated in FIG. 3, data center 1 and data center 2 are interconnected via an autonomous intranetwork connection 308. Application data, e.g., brand image application data, may be synchronously replicated between data center 1 and data center 2 via the autonomous intranetwork connection 308. Application data may be asynchronously replicated from data center 1 and data center 2 to a third data center 304-3 via a second autonomous intranetwork connection 310. Although embodiments are not limited to having particular limits on distances between data centers, data center 1 and data center 2 may be more proximate to each other than they are to data center 3, at least in part because of the generally faster speed of asynchronous replication of data over the second autonomous intranetwork connection 310.

Servers, e.g., servers 306-1, may host a number of applications. An organization may host one or more applications in multiple data centers. In one or more embodiments, a number of applications may be made fully available to a client, e.g., client 320-1, via at least one of the first access point 302-1 and second access point 302-2 when the specific network address 313 is advertised via either point, e.g., when either access point is functional. Analogous to the description above, application data may be synchronously replicated between data center 1 and data center 2. Accordingly, full availability of an application may be maintained from either data center via an associated intranet access point.

According to one or more embodiments, at least partial availability of one or more applications may be provided to a client via the third access point 302-3 when neither a first access point 302-1 nor a second access point 302-2 is functional. For example, a member client may be provided with access to at least certain static portions of a number of applications via the third access point 302-3. In the same example, a non-member client may be provided with access to certain public static portions of applications via any functional access point. Accordingly, when the third access point 302-3 is functional and first and second access points 302-1 and 302-2 are not functional, unavailability of applications via the first and second access points 302-1 and 302-2 may be concealed to the non-member client.

Figure 4:
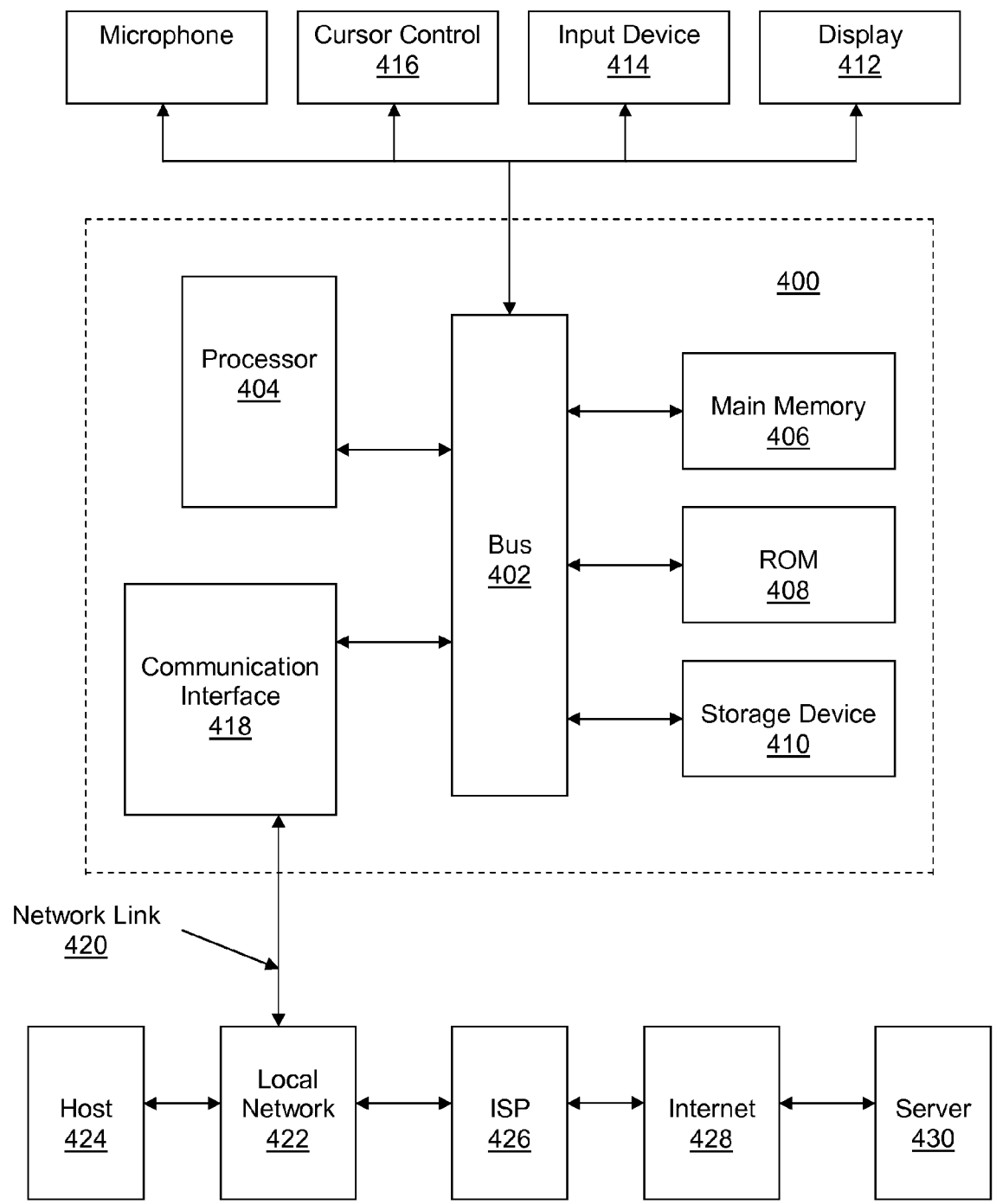
FIG. 4 illustrates a computer system upon which an embodiment or embodiments may be implemented.

Referring to FIG. 4, a block diagram illustrates an exemplary computer system 400 upon which process flows in accordance with principles of embodiments may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

One or more populating acts may be provided by computer system 400 in response to processor 404 executing one or more sequences of one or more instructions contained in main memory 406. Such instructions may be read into main memory 406 from another computer-readable medium or computing device readable medium, such as storage device 410. Execution of the sequences of instructions contained in main memory 406 causes processor 404 to perform processes described herein. One or more processors in a multi-processing arrangement may also be employed to execute the sequences of instructions contained in main memory 406. In other embodiments, hard-wired circuitry may be used in place of, or in combination with, software instructions. Thus, embodiments are not limited to any specific combination of hardware circuitry and software.

The term "computer-readable medium" or "computing device readable medium" as used herein refers to any medium that participates in providing instructions to processor 404 for execution. Such a medium may take many forms, including but not limited to, non-volatile media, volatile media, and transmission media. Non-volatile media include, for example, optical or magnetic disks, such as storage device 410. Volatile media include dynamic memory, such as main memory 406. Transmission media include coaxial cables, copper wire and fiber optics, including the wires that comprise bus 402. Transmission may also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer may read.

Various forms of computer readable media may be involved in carrying one or more sequences of one or more instructions to processor 404 for execution. For example, the instructions may initially be borne on a magnetic disk of a remote computer. The remote computer may load the instructions into its dynamic memory and send the instructions over a telephone line using a modem. A modem local to computer system 400 may receive the data on the telephone line and use an infrared transmitter to convert the data to an infrared signal. An infrared detector coupled to bus 402 may receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network, now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 may send messages and receive data, including program code, through the network(s), network link 420, and communication interface 418. In the Internet example, a server 430 might transmit a requested code for an application program through Internet 428, Internet service provider (ISP) 426, local network 422 and communication interface 418. One such downloaded application provides for, or participates in, presenting brand images. Other such downloaded applications may include banking applications, e-commerce applications, accounting applications, inventory tracking applications, and the like. The received code may be executed by processor 404 as it is received, and/or stored in storage device 410, or other non-volatile storage for later execution. In this manner, computer system 400 may obtain application code in the form of a carrier wave.

Referring to FIG. 1 through FIG. 4, it should be noted that while embodiments have been described in reference to a possible failure or other disaster, such failure is not required to enjoy the benefits of what is conceived and claimed. For example, the automatic redundancy and failover capabilities provided by embodiments may be useful during normal maintenance functions. More specifically, when a technician reboots or otherwise temporarily shut down the first data center, whether intentionally or not, the system automatically may cover with the second data center, thereby providing a seamless experience for a customer at a client terminal.

To facilitate recovery after a catastrophic failure, according to some embodiments, some data centers are preferably mirrors of one another and physically separated from one another. Physically separating the data centers minimizes the possibility of a single catastrophic failure bringing down the entire system. The locations of data centers may be on-site company locations, but may also be off-site locations if needed and may be separated from one another by a sufficient distance (e.g., a quarter mile, half a mile, a mile, etc.) so as to minimize the possibility of one natural or man-made disaster or act of terrorism or sabotage taking down data centers at the same time, but not so far as to hinder real-time communication between two data centers. According to some embodiments, some data centers are located on the same company location or campus Locating some data centers on the same campus allows for ready access to the data centers and full control over an interconnecting local network. An interconnecting network may be any suitable high-speed network commonly used by those skilled in the art for electronic communication and data transfer, including a local area network (LAN), a wide area network (WAN), a private network (intranet), a public network (the Internet), or some combination thereof.

Routers of the Internet 150 or 250 or other networks may use routing protocols to build route tables in order to efficiently direct traffic between devices or systems connected through the Internet. Exemplary routing protocols include Routing Information Protocol (RIP), Border Gateway Protocol (BGP), Intermediate system to intermediate system (IS-IS), and Open Shortest Path First (OSPF) protocol. In any case, the routing tables specify how to connect one node, device, or system, such as a client, to another, such as a data center. The routing tables may be manually built. However, the routing tables usually are automatically built according to the routing protocols. For example, BGP works by establishing peer relationships between adjacent routers. The peer routers exchange route updates that reflect the network topology. The route updates are exchanged repeatedly to reflect changes to the network, such as routers going down and new routers coming online.

When a router advertises routing information to one of its BGP neighbors, that information is generally considered valid until the router explicitly advertises that the information is no longer valid or until the connection is lost or closed. To keep a connection open, each BGP router periodically sends keep-alive messages. These messages are typically 19 bytes long and sent every 60 seconds by default. In this manner, each BGP router maintains its own routing table. Based on its routing table, each BGP router selects the best route to use between every known node. In order to select the best route, a BGP routing table includes a number of attributes, which may be used to prefer one route over another.

Normally, routers associated with the access points would advertise their own unique and specific IP addresses and/or that of the data centers behind them. According to some embodiments, rather than advertising a specific IP address of a data center, an access point may advertise a non-specific IP address that only specifies the first two or three octets of an IP address. For example, as shown in FIG. 3, the access point 302-3 may advertise an IP address of 10.0/16 and the second access point 302-2 may advertise an IP address of 10.0.255.10/32.

For description herein, the order of steps may occur in a variety of sequences unless otherwise specifically limited. The various steps described herein may be combined with other steps, interlineated with the stated steps, and/or split into multiple steps. Similarly, elements have been described functionally and may be embodied as separate components or may be combined into components having multiple functions.

Not every potential embodiment has been described, and modifications and alterations to the described embodiments are available to those of ordinary skill in the art. The disclosed and undisclosed embodiments are not intended to limit or restrict the scope or applicability of that which is conceived of by the Applicants, but rather, in conformity with the patent laws, Applicants intend to fully protect all such modifications and improvements that come within the scope or range of equivalents of the claims below.

Although specific embodiments have been illustrated and described herein, those of ordinary skill in the art will appreciate that an arrangement calculated to achieve the same results may be substituted for the specific embodiments disclosed. This disclosure is intended to cover adaptations or variations of various embodiments. It is to be understood that the above description has been made in an illustrative fashion, and not a restrictive one. Combination of the above embodiments, and other embodiments not specifically described herein, will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter may also be found in less than all features of a single disclosed embodiment. Thus, the following claims are hereby incorporated into the Detailed Description, with each claim standing on its own as a separate embodiment.

What is claimed is:

1. A system for online continuity, comprising:
a processor unit;
a memory coupled to the processor unit wherein the processor unit and the memory are configured to provide storage of a set of computer-readable instructions executable to implement a system for online continuity including:
a first Internet access point via which a first specific network address is advertised for an application, the application containing:
a login web page and web pages of the application which contains static data and
application data;
a second Internet access point via which a second specific network address is advertised for the application;
a third Internet access point via which a less-specific network address is advertised for the application;
wherein the application is available to a client via at least one of the first and second Internet access points when at least one of the first and second Internet access points meets particular criteria including an active physical layer connection and service via a physical layer access point;

wherein login web page of the application and web pages of the application containing the static data is available to the client via the third Internet access point when at least one of the first and second Internet access points fails to meet the particular criteria;

wherein the application data alone is synchronously replicated between a first data center associated with the first Internet access point and a second data center associated with the second Interact access point, wherein the first data center and the second data center confirm the data replication; and wherein the application data alone is asynchronously replicated from the first and second data centers to a third data center associated with the third Internet access point, wherein the first and second data centers do not confirm the data replication with the third data center.

2. The system of claim 1, wherein:

processing of application data is split between the first and second data centers via a first autonomous intranetwork connection;

application data is atomically replicated between the first and second data centers via the first autonomous intranetwork connection; and application data is durably replicated from the first and second data centers to the third data center via a second autonomous intranetwork connection.

3. The system of claim 1, wherein:

the first and second specific network addresses are advertised as a first and a second single-host Internet protocol (IP) address; and the less-specific address is advertised as a multi-host IP address with a network prefix equal to at least a portion of the first and second single-host IP addresses.

4. The system of claim 1, wherein the application is at least partially available to the client using at least one selected from the group including:

a website server;
a database server;
a file server; and
a program application server.

5. The system of claim 1, wherein the application is a website that is available to the client and includes: the web pages and the login page.

6. The system of claim 5, wherein:

the login page conceals a failure to meet particular criteria of at least one of the first and second Internet access points to non-member clients; and certain static data provided to member clients via the website conceals the failure to meet particular criteria of at least one of the first and second Internet access points to member clients.

7. A method for online continuity, comprising:

advertising a first specific network address for an application via a first Internet access point, the application containing:
    a login web page and web pages of the application which contains static data and
    application data;
advertising a second specific network address for the application via a second Internet access point;
advertising a less-specific network address for the application via a third Internet access point;
making the application available to a client via at least one of the first and second Internet access points when at least one of the first and second Internet access points meets particular criteria including an active physical layer connection and service via a physical layer access point;

making a login web page of the application and web page of the application containing the static data available to the client via the third Internet access point when at least one of the first and second Internet access points fails to meet the particular criteria;

synchronously replicating the application data alone between a first data center associated with the first Internet access point and a second data center associated with the second Internet access point, wherein the first data center and the second data center confirm the data replication; and asynchronously replicating the application data alone from the first and second data centers to a third data center associated with the third Internet access point, wherein the first and second data centers do not confirm the data replication with the third data center.

8. The method of claim 7, including:

splitting processing of application data between the first and second data centers via a first autonomous intranetwork connection;

atomically replicating application data between the first and second data centers via the first autonomous intranetwork connection; and durably replicating application data from the first and second data centers to the third data center via a second autonomous intranetwork connection.

9. The method of claim 7, including:

advertising the first and second specific network addresses as a first and second single-host Internet protocol (IP) address; and advertising the less-specific address as a multi-host IP address with a network prefix equal to at least a portion of the first and second single-host IP addresses.

10. The method of claim 7, wherein making the application available to the client includes making the application available to the client using at least one selected from the group including:

a website server;
a database server;
a file server; and
a program application server.

11. The method of claim 7, wherein making the website available to the client includes making a website available to the client that includes: the web pages and the login page.

12. The method of claim 11, including:

concealing a failure to meet particular criteria of at least one of the first and second Internet access points to non-member clients with the login page; and concealing the failure to meet particular criteria of at least one of the first and second Internet access points to member clients with certain static data provided via the website.

13. A non-transitory computer readable medium having instructions stored thereon, which, when executed by one or more processors, cause one or more devices to perform a method for online continuity, comprising:

advertising a first specific network address for an application via a first Internet access point, the application containing:
    a login web page and web pages of the application which contains static data and
    application data;

advertising a second specific network address for the application via a second Internet access point;

advertising a less-specific network address for the application via a third Internet access point;

making the application available to a client via at least one of the first and second Internet access points when at least one of the first and second Internet access points meets particular criteria including an active physical layer connection and service via a physical layer access point;

making a login web page of the application and web page of the application containing the static data available to the client via the third Internet access point when at least one of the first and second Internet access points fails to meet the particular criteria;

synchronously replicating the application data alone between a first data center associated with the first Internet access point and a second data center associated with the second Internet access point, wherein the first data center and the second data center confirm the data replication; and asynchronously replicating the application data alone from the first and second data centers to a third data center associated with the third Internet access point, wherein the first and second data centers do not confirm the data replication with the third data center.

14. The medium of claim 13, wherein the method includes:

splitting processing of application data between the first and second data centers via a first autonomous intranetwork connection;

atomically replicating application data between the first and second data centers via the first autonomous intranetwork connection; and durably replicating application data from the first and second data centers to the third data center via a second autonomous intranetwork connection.

15. The medium of claim 13, wherein the method includes:

advertising the first and second specific network addresses as a first and second single-host Internet protocol (IP) address; and advertising the less-specific address as a multi-host IP address with a network prefix equal to at least a portion of the first and second single-host IP addresses.

16. The medium of claim 13, wherein the method includes making the application available to the client including making the application available to the client using at least one selected from the group including:

a website server;

a database server;

a file server; and a program application server.

17. The medium of claim 13, wherein the method includes making the website available to the client that includes: the web pages and the login page.

18. The medium of claim 17, wherein the method includes:

concealing a failure to meet particular criteria of at least one of the first and second Internet access points to non-member clients with the login page; and concealing the failure to meet particular criteria of at least one of the first and second Internet access points to member clients with certain static data provided via the website.

* * * * *